(12) United States Patent
Glazkova et al.

(10) Patent No.: US 10,578,769 B2
(45) Date of Patent: Mar. 3, 2020

(54) METHOD FOR VISUALIZATION OF FLUID FILTRATION IN HETEROGENEOUS POROUS MEDIUM

(71) Applicants: Ekaterina A. Glazkova, Moscow (RU); Maria M. Sorokina, Moscow (RU); Dmitri A. Eydinov, Moscow (RU)

(72) Inventors: Ekaterina A. Glazkova, Moscow (RU); Maria M. Sorokina, Moscow (RU); Dmitri A. Eydinov, Moscow (RU)

(*) Notice: Subject to any disclaimer, the term of this patent is extended or adjusted under 35 U.S.C. 154(b) by 486 days.

(21) Appl. No.: 14/999,650

(22) Filed: Jun. 10, 2016

(65) Prior Publication Data

US 2016/0364508 A1 Dec. 15, 2016

(51) Int. Cl.
*G01V 99/00* (2009.01)
*G01V 11/00* (2006.01)
*E21B 47/10* (2012.01)
*E21B 43/00* (2006.01)
*E21B 43/20* (2006.01)

(52) U.S. Cl.
CPC ............ *G01V 99/005* (2013.01); *E21B 47/10* (2013.01); *G01V 11/00* (2013.01); *E21B 43/00* (2013.01); *E21B 43/20* (2013.01); *G01V 2210/644* (2013.01); *G01V 2210/66* (2013.01)

(58) Field of Classification Search
CPC .......... E21B 43/20; E21B 47/10; E21B 43/00; G01V 11/00; G01V 2210/644; G01V 99/005; G01V 2210/66; G06F 17/5009
USPC .......................................................... 703/10
See application file for complete search history.

(56) References Cited

U.S. PATENT DOCUMENTS

| | | | | | |
|---|---|---|---|---|---|
| 5,734,756 | A | * | 3/1998 | Sherman | G06T 11/203 |
| | | | | | 382/259 |
| 8,437,962 | B2 | * | 5/2013 | Craig | E21B 43/26 |
| | | | | | 166/308.1 |

OTHER PUBLICATIONS

Thiele, Marco R., R. P. Batycky, and D. H. Fenwick. "Streamline simulation for modern reservoir-engineering workflows." Journal of Petroleum Technology; (2010). pp. 64-70. (Year: 2010).*
Liu, J., E. D. Parker, and D. Camilleri. "A new particle tracking algorithm for tracer flow simulation." SPE Reservoir Simulation Symposium. Society of Petroleum Engineers, 1999. pp. 1-8. (Year: 1999).*
Tang, R. W., R. A. Behrens, and A. S. Emanuel. "Reservoir studies with geostatistics to forecast performance." SPE Reservoir Engineering 6. 02 (1991). pp. 253-258. (Year: 1991).*
Kong, V. P., B. H. Ong, and K. H. Saw. "Range restricted interpolation using cubic Bézier triangles." (2004). pp. 1-8. (Year: 2004).*

* cited by examiner

*Primary Examiner* — Kamini S Shah
*Assistant Examiner* — John E Johansen

(57) ABSTRACT

A method and system for visualization of a direction of a fluid flow in heterogeneous porous medium in hydrocarbon reservoirs based on the streamlines. The method allows for constructing the detailed and accurate model of a direction and a volume of the fluids being transferred between the wells and can be used for analysis of waterflooding and hydrodynamic connectivity between the wells used in oil and gas reservoirs with a large number of wells. The visualization method can be used both for analysis of instantaneous fluid flows at the current calculation step of hydrodynamic simulator and for analysis of fluid flows accumulated over several calculation steps.

15 Claims, 3 Drawing Sheets

METHOD FOR VISUALIZATION OF FLUID FILTRATION IN HETEROGENEOUS POROUS MEDIUM

CROSS-REFERENCE TO RELATED APPLICATION

This application is a non-provisional application of U.S. Provisional Patent Application No. 62/121,549 filed Feb. 27, 2015, entitled METHOD AND DEVICE FOR VISUALIZATION OF FLUID FILTRATION DIRECTION IN HETEROGENEOUS POROUS MEDIUM IN THE HYDROCARBON DEPOSITS ON THE BASIS OF STREAMLINES.

BACKGROUND OF THE INVENTION

Field of the Invention

This invention relates to a dynamic data visualization, and more particularly, to a graphic simulation of a fluid flow in a heterogeneous porous medium in hydrocarbon reservoirs on the basis of streamlines.

Description of the Related Art

Various methods for visualization of a flow of fluids between wells are known. In the conventional methods, all flows of the fluids are visualized on a graphic map in a form of various curves. Directions of flow are simulated directly along streamlines (See Sidelnikov K. A., Lyalin V. E., Grigoriev I. M. Simulation on the basis of tubes and streamlines methods/Bulletin of Udmurt University. Ser. Earth sciences. 2012. Edition 2. P. 109-119 and Bondarev A. E., Galaktionov V. A., Chechetkin V. M. Scientific visualization in the problems of computational mechanics of fluid and gas/Scientific electronic magazine "Scientific Visualization", National Research Nuclear University "Moscow Engineering Physics Institute," M., 2010, Volume 2, No. 4, P. 1-26).

A streamline is a curve, the tangent to which in each point coincides with the direction of motion velocity vector of fluid particles at this point. The streamlines are widely used in simulation of oil and gas reservoirs for waterflooding optimization, history matching and for visualization of results produced by a hydrodynamic simulator calculations.

In order to show the additional information at visualization, streamline color and thickness can be varied. A number of the streamlines to visualize flow of fixed fluid volume can vary also as follows: more streamlines can be considered for more accurate description. One of drawbacks of this approach is that it allows for visualization of the fluid flows only within one calculation step of hydrodynamic simulator and gives no accumulated indices. In other words, no information on how the fluid flows are changed during several calculation steps is available.

Thus, visualization using streamlines reflects only instantaneous indices. Considering the streamlines within one calculation step makes it impossible to determine zones covered by waterflooding for the entire period of a field development. Another drawback of this approach is that, when using the known method for data visualization at the fields with a large number of wells, a large number of streamlines on the map makes visual analysis of data almost impossible.

Reducing the number of streamlines by increasing a fluid volume visualized by one streamline results in loss of the information on hydrodynamic connectivity of wells having the fluid flow volume between them that is lowere than the volume referring to one streamline. There are visualization methods of direction of the fluid flow in heterogeneous porous medium using straight lines (See Thiele M R. Streamline simulation/8th International forum on reservoir simulation. Stresa/Lago Maggiore, Italy, 2005 and Batycky R. P., Thiele M. R. "System and methods for visual interpretation of well rate allocation factors", U.S. Pat. No. 6,519,531). In this approach, an injection well and production well (between which the fluid is flowing) are connected by a straight line, the thickness of which corresponds to the fluid flow volume between the wells.

The advantage of this method is its applicability to the fields with a large number of wells. The data presented in this way can be analysed much more easily, moreover, this approach can be used to analyse fluid flows accumulated over several steps. The drawback of this approach is impossibility to define the actual fluid flow direction between the wells, which is necessary to determine the most waterflooded sectors of the reservoir. Since the medium wherein the fluid flow occurs is heterogeneous, usually the trajectory of particle motion between wells significantly differs from the straight line being visualized.

FIG. 1 illustrates a conventional method of construction of graphic model of fluid flow direction (130) in heterogeneous porous medium in hydrocarbon reservoirs based on streamlines between injection (120) and production wells (110) using streamlines.

Based on streamlines, the pairs of injection (120) and production wells (110) are determined, between which fluid flow (130) exists. Based on the data obtained on a set of wells, the graph is simulated on the map, and the vertices of the graph are wells (120 and 110) connected by an edge, if fluid flow (130) between them exists.

Patent application US 20120191432 (Khataniar et al.) describes the method of visualization using pie charts, where each sector corresponds to the well interacting with the given well, and the sector size corresponds to the fluid flow volume between the wells. The advantage of this approach is that it can be used to show the fluid flow volume between the wells accumulated over several calculation steps.

The drawback of this approach is that it has no graphic representation of main fluid flow directions between the wells that impedes significantly the acquisition of valid data for fluid flow adequate analysis.

Accordingly, an improved and efficient method for visualization of a fluid flow in a heterogeneous porous medium in hydrocarbon reservoirs on the basis of streamlines is desired.

SUMMARY OF THE INVENTION

This invention relates to method and system for graphic simulation of a fluid flow in a heterogeneous porous medium in hydrocarbon reservoirs on the basis of streamlines that substantially overcomes one or more disadvantages of the related art.

The present invention is directed to a method and system for visualization of direction of a fluid flow in heterogeneous porous medium in hydrocarbon reservoirs based on the streamlines. The method allows for constructing the detailed and accurate model of a direction and a volume of the fluids being transferred between the wells and can be used for analysis of waterflooding and hydrodynamic connectivity between the wells used in oil and gas reservoirs with a large number of wells. The visualization method can be used both for analysis of instantaneous fluid flows at the current calculation step of hydrodynamic simulator and for analysis of fluid flows accumulated over several calculation steps.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
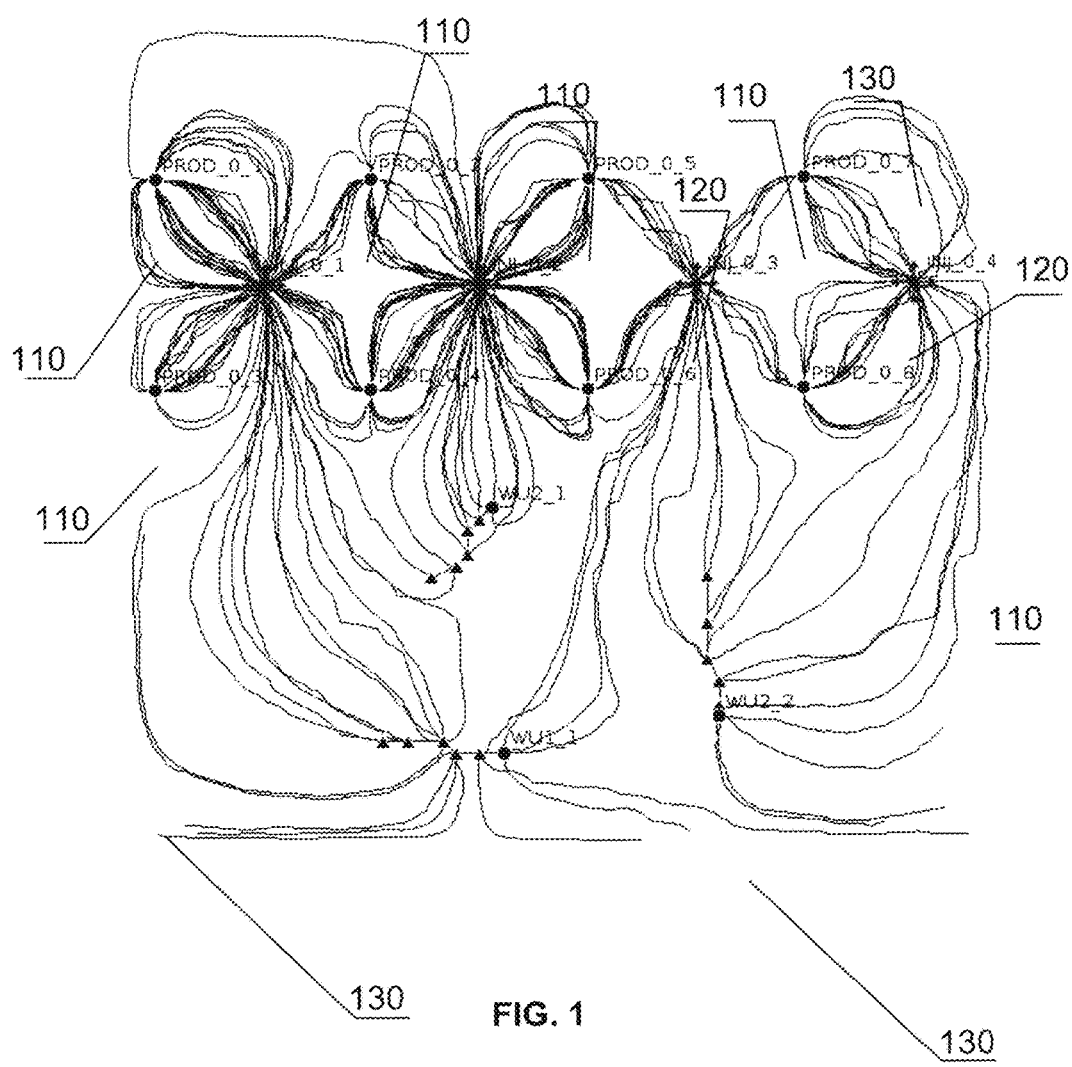
FIG. 1 illustrates a conventional graphic representation of a flow of fluid between the wells using a method based upon streamline visualization.

Reference will now be made in detail to the preferred embodiments of the present invention, examples of which are illustrated in the accompanying drawings.

The present invention is directed to a method and system for visualization of direction of a fluid flow in heterogeneous porous medium in hydrocarbon reservoirs based on the streamlines. The method allows for constructing the detailed and accurate model of a direction and a volume of the fluids being transferred between the wells and can be used for analysis of waterflooding and hydrodynamic connectivity between the wells used in oil and gas reservoirs with a large number of wells. According to an exemplary embodiment, the visualization method can be used both for analysis of the instantaneous fluid flows at the current calculation step of hydrodynamic simulator and for analysis of the fluid flows accumulated over several calculation steps.

According to the exemplary embodiment, the method of visualization of the fluid flow direction in heterogeneous porous medium in hydrocarbon reservoirs based on the streamlines comprises the following steps:
- determining streamlines using particle tracing on the basis of three-dimensional pressure map and reservoir porosity and permeability properties;
- determining pairs of injection and production wells, having a fluid flowing between them on the basis of streamlines;
- building a graph of fluid flows between the wells, in which vertices are located above the injection and the production wells, which are connected by their edges, if there is a fluid flow between them;
- visualizing the above graph edges in the form of curves that are constructed through interpolation performed over points obtained from the streamlines.

In another preferred embodiment, the graph is simulated on the two-dimensional map of a field. In another embodiment, the field map is being plotted using projection of the three-dimensional field hydrodynamic model onto a plane. According to one exemplary embodiment, a polynomial interpolation or an interpolation with splines are used. In yet another exemplary embodiment, an interpolation with cubic splines or an interpolation with B-splines are employed. In one preferred embodiment, an interpolation with splines, the segments of which are represented by Bezier curves, is used.

In another embodiment, each N-th point of streamline, along which a particle goes from the injection well to the production well within the shortest time, is taken to construct the set of interpolation points. In yet another embodiment, a set of points, where each point is the center of mass of a set of points, wherein particles corresponding to different streamlines have been at the fixed moments of time, is taken as a basis of interpolation. In another embodiment, a set of points where each point is the center of mass of a set of points, wherein particles corresponding to different streamlines have been at the moments of time corresponding to equal percentage of distance covered from one well to another, is taken as a basis for interpolation. In another embodiment, interpolation with quadratic Bezier curve plotted by three control points is used, wherein:
- the first point is the projection of an upper boundary coordinate of the injection well upper perforated interval onto a two-dimensional map;
- the second point is taken so that the Bezier curve would pass through a point, which is the projection onto a two-dimensional map of a center of mass of set of points where each point corresponds to the midpoint of one of streamlines connecting the injection and the production wells;
- the third point is the projection of the production well upper perforated interval upper boundary coordinate onto a two-dimensional map.

In another embodiment, the midpoint of a streamline is the point wherein a particle appears in a half-time interval for which a particle covers the distance from the beginning to the end of the streamline.

In another embodiment, the second control point (x2, y2) of Bezier curve is calculated by the following formula:

$$x2 = 2 * x\_center\_mass - 0.5 * (x1 + x3),$$

$$y2 = 2 * y\_center\_mass - 0.5 * (y1 + y3),$$

where:
(x1, y1) are the first point coordinates,
(x_center_mass, y_center_mass) are the coordinates of the point which is the projection onto two-dimensional map of the center of mass of set of points, where each point corresponds to the midpoint of one of streamlines connecting the injection and the production wells;
(x3, y3) are the third point coordinates.

The claimed invention also includes a device configured to implement the visualization method. The streamlines calculated using particle tracing on the basis of three-dimensional pressure map, are used as input data of the visualization method, in accordance with the preferred embodiment. The pressure map is a result of a solution of the combined equations of multicomponent multiphase flow in heterogeneous porous medium (See Chen Z., Huan G., Ma Y. Computational Methods for Multiphase Flows in Porous Media. Philadelphia: Siam, 2006. p. 561. ISBN: 0-89871-606-3).

A streamline shape is determined by reservoir porosity and by permeability properties and the current three-dimensional pressure map in a field hydrodynamic model blocks obtained during calculation of this model by, a hydrodynamic simulator. The streamline is shown as a set of points where each point corresponds to the flow particle position at some point in time. For each point, the coordinates (X, Y, Z) and the moment of time, T, wherein the particle was in the given point, are determined. Also, for each streamline the data of the wells where the streamlines start and end, is stored.

As discussed above, FIG. 1 illustrates a conventional graphic representation of a flow of fluid between the wells using a method based upon streamline visualization. A curve plotted through interpolation on points obtained from the streamlines is important for analysis, since zones close to this curve are the zones with the most intense flow of the reservoir fluid. Zones remote from the curve are very likely the zones of remaining oil reserves.

Moreover, usage of the interpolation on points obtained from streamlines as the method of visualization of fluid flows between the wells, advantageously, requires only a small amount of memory to store the calculation results. At each calculation step of the hydrodynamic simulator, for each pair of interacting wells, only the points on which the interpolation is performed and the volume of fluid flow from injection well to production well need to be stored.

The points for interpolating can be selected using various methods. For example, each N-th point of a streamline, along which a particle travels from the injection well to the production well within the shortest time, can be taken as a set of interpolation points. Another method is to take for each streamline a set of points corresponding to a particle position at some fixed points in time and to average them out for several streamlines. That is, to construct such set of points where each point is the center of mass of a set of points wherein particles corresponding to different streamlines have been at the specified points in time.

Another option is using a similar percentage of distance covered by a particle from one well to another, instead of similar moments of time. In another embodiment, three control points are used to plot a Bezier curve. If fixed points that do not change during the calculation steps are selected as terminal points, for example, the well heads or coordinates of upper boundary of well upper perforated interval, the terminal points do not need to be stored and for each pair of wells. Only a fluid flow volume and a middle control point of Bezier curve are required to be stored.

Figure 2:
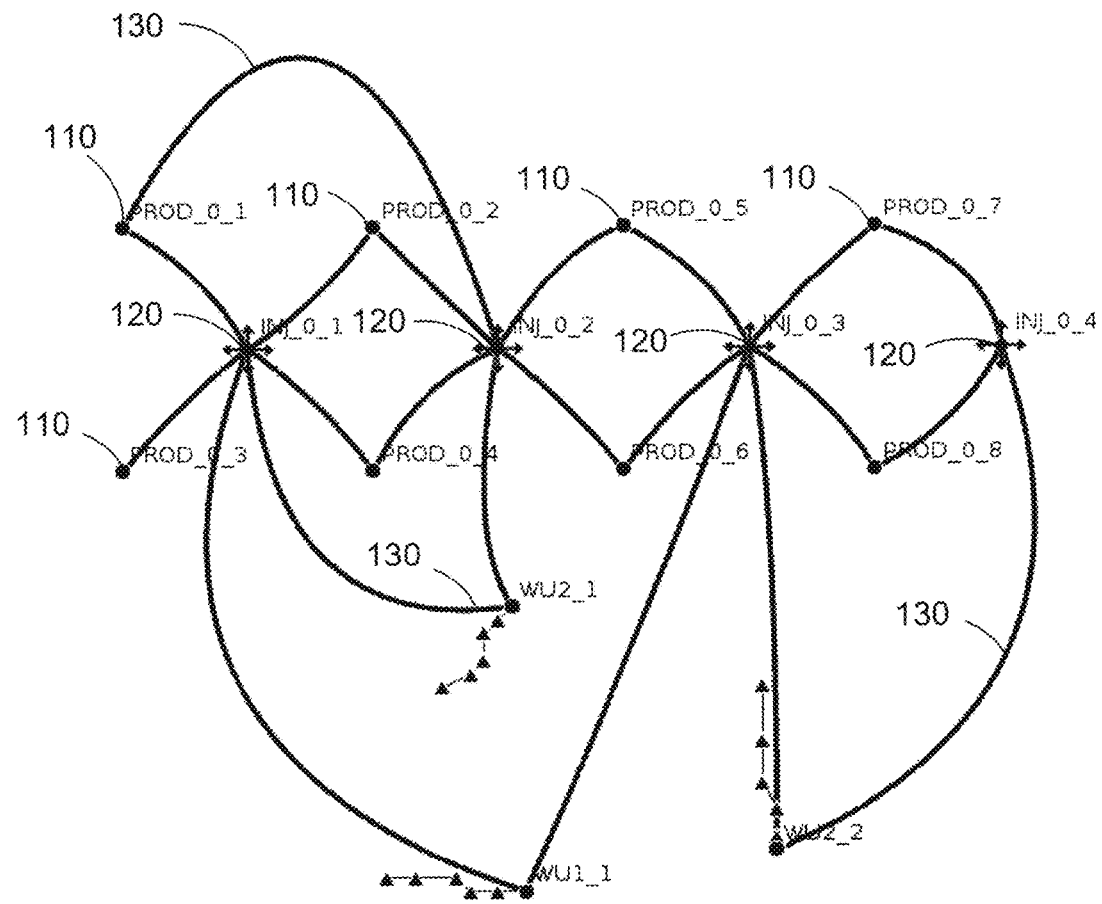
FIG. 2 illustrates a graphic representation of a flow of fluid between the wells using interpolation based on three control points obtained from streamlines, based upon quadratic Bezier curve, in accordance with the exemplary embodiment.

FIG. 2 illustrates a graphic representation of a flow of fluid between the wells using interpolation based on three control points obtained from streamlines, based upon quadratic Bezier curve, in accordance with the exemplary embodiment.

Graph edge (130) is plotted under the principle of visualization of fluid flow direction between the injection wells (120) and the production (110) wells using quadratic Bezier curve. According to the preferred embodiment, the Quadratic Bezier curve is plotted by three control points where:

the first point (x1, y1) is the projection of upper boundary coordinate of injection well upper perforated interval onto a two-dimensional map;

the second point (x2, y2) is taken so that the Bezier curve would pass through a point, which is the projection onto a two-dimensional map of the center of the points set, where each point corresponds to the midpoint of one of the streamlines connecting the injection and the production wells;

the third point (x3, y3) is the projection of an upper boundary coordinate of the production well's upper perforated interval onto the two-dimensional map.

The midpoint of the streamline is the point, wherein a particle appears in a half-time interval, for which a particle covers the distance from the beginning to the end of the streamline.

The second control point (x2, y2) of Bezier curve is calculated by the following formula:

$$x2 = 2 * x\_center\_mass - 0.5 * (x1 + x3),$$

$$y2 = 2 * y\_center\_mass - 0.5 * (y1 + y3),$$

where:

(x1, y1) are the first point coordinates;

(x_center_mass, y_center_mass) are the coordinates of the point, which is the projection onto the two-dimensional map of center of mass of the set of points, where each point corresponds to the midpoint of one of the streamlines connecting the injection wells 120 and the production wells 110; and (x3, y3) are the third point coordinates.

Thus, the graph edges visualize the data of a fluid flow direction between the pairs of the injection and the production wells in a heterogeneous porous medium.

Then, the graph obtained is visualized on two-dimensional or three-dimensional map of the field. The field two-dimensional map is constructed through projecting of the field hydrodynamic model three-dimensional grid onto a plane. Boundaries of wells perforated intervals are also projected onto this plane. Also, the two-dimensional map can represent cross section of the field three-dimensional map.

The user can manage graph visualization keeping only those vertices and edges in it that are of his interest at the moment. For example, the user can adjust visualization so that only edges between wells the selected would be displayed. Or user can specify limit values of fluid flow volume in order not to visualize the graph edges when fluid flow between wells is less than, or exceeds, some specified limit value.

The proposed method of visualization can be used to visualize accumulated flows between wells. In this case, for each time step of the time interval being considered, streamlines are constructed. Then, using one of the disclosed above methods, a set of points is selected for interpolation within one calculation step. After that, a set of point is plotted, where each point is the averaging of the corresponding points from separate time steps.

In another embodiment, the Bezier curve is plotted which is the averaging of Bezier curves for separate steps. For the second control point of the averaged Bezier curve, the point is taken which is the center of mass of the set of the second control points of Bezier curves obtained for each calculation step of the time interval being considered.

Thus, with the proposed method of visualization, a user obtains an accurate model of the fluid flow direction that allows for obtaining a complete set of analytical data depicting direction of the most intense fluid flow in heterogeneous porous medium.

Figure 3:
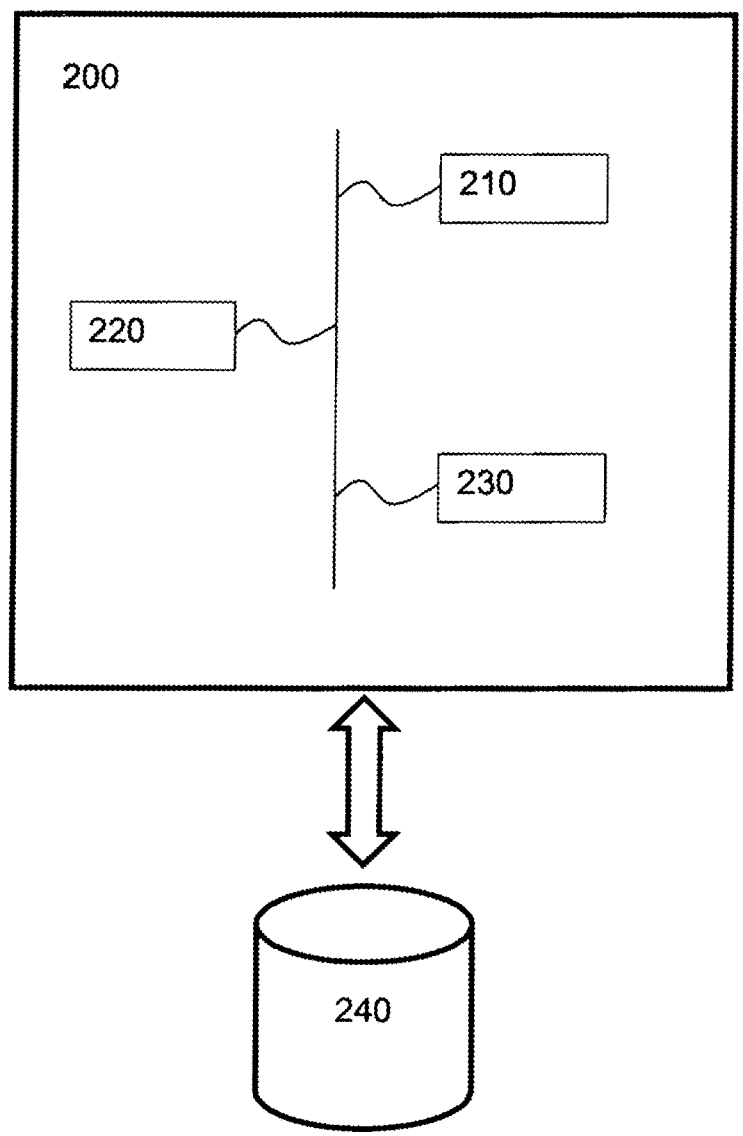
FIG. 3 illustrates a device for visualization of a fluid flow direction in heterogeneous porous medium in hydrocarbon reservoirs based on streamlines, in accordance with the exemplary embodiment.

FIG. 3 illustrates a device (200) for implementation of the method of visualization of fluid flow direction in heterogeneous porous medium in hydrocarbon reservoirs based on streamlines. The device (200) comprises one or more processors (210) connected via the data bus (Serial Bus) with one or more memory devices (220) and input/output (I/O) devices (230). The memory (220) of the device (200) comprises the instructions executed by one or more processors (210) to implement the method of two-dimensional or three-dimensional visualization of fluid flow direction in heterogeneous porous medium in hydrocarbon reservoirs based on streamlines.

The device (200) can be a desktop computer, a mainframe, a server or a server cluster, a laptop or any other suitable type of device that allows implementing of the visualization method implementation. Memory (220) can be, but is not limited to, a read-only memory (ROM) or a random access memory (RAM) or a hard disk drive (HDD) or an external machine-readable data medium, or combinations thereof. An external machine-readable data medium can be selected from the group as follows: a USB flash drive, a memory card, an optical disc, a mini disc, an external HDD or any other suitable type of medium arranged to be used in the device (200). I/O interfaces, for example, can be, but are not limited to, serial ports, parallel ports, a universal serial bus (USB), IEEE-1394 (i.Link or FireWare), LAN.

The memory (220) comprises machine-readable instructions, which being executed by one or more processors to perform the steps of construction of graphic model that visualize fluid flow direction in heterogeneous porous medium in hydrocarbon reservoirs based on streamlines. The instructions contained in the memory (220) of the device (200) perform the steps of the disclosed above visualization method. During commands execution by one or more processors (210) of the device (200), the general steps of the method described above are implemented. Other embodiments of the method are also implemented using the device (200) and will be appreciated by those skilled in the art.

Apart from built-in means of image on-screen displaying, e.g. a laptop display, the device can use the external means of data displaying for data visualization, such as an external display or a projector, or it can use a remote device arranged to display graphic information streaming from the device (200).

Having thus described a preferred embodiment, it should be apparent to those skilled in the art that certain advantages of the described method and apparatus have been achieved. In particular, those skilled in the art will appreciate that the proposed method provides for an efficient and improved method for graphic simulation of a fluid flow in a heterogeneous porous medium in hydrocarbon reservoirs on the basis of streamlines.

It should also be appreciated that various modifications, adaptations, and alternative embodiments thereof may be made within the scope and spirit of the present invention. The invention is further defined by the following claims.

What is claimed is:

1. A computer-implemented method of visualization of fluid flow direction in heterogeneous porous medium in hydrocarbon reservoirs based on streamlines, the method comprising:
   determining streamlines using particles tracing on a basis of a three-dimensional pressure map and a reservoir porosity and a permeability properties;
   determining pairs of injection and production wells having fluid flow between them, on a basis of a plurality of streamlines;
   building a graph of fluid flows between the injection and the production wells, having the injection and the production wells serve as graph vertices connected by an edge; and
   visualizing the graph edges in a form of curves constructed by a spline-based interpolation of points obtained from the plurality of the streamlines using segments represented by quadratic Bezier curves,
   wherein a midpoint of a streamline of the plurality of the streamlines is a point, where a particle appears in a halfway distance interval, which the particle covers from beginning to end of the streamline, and
   wherein the midpoint coordinates (x2, y2) of Bezier curve are calculated as:

$$x2=2*x\_center\_mass-0.5*(x1+x3),$$

$$y2=2*y\_center\_mass-0.5*(y1+y3),$$

where (x1, y1) are coordinates of a first control point, (x_center_mass, y_center_mass) are coordinates of a point which is a projection onto a two-dimensional map of a center of mass of a set of points, where each point corresponds to the midpoint of one of the streamlines of the plurality of the streamlines connecting the injection and the production wells, and (x3, y3) are coordinates of a third control point.

2. The method of claim 1, wherein the graph is simulated on a two-dimensional map of a field.

3. The method of 2, wherein the two-dimensional map of the field is constructed by projecting of a field hydrodynamic model three-dimensional grid onto a plane or onto a cross section.

4. The method of claim 1, wherein the interpolation of points is a polynomial interpolation.

5. The method of claim 1, wherein the interpolation with splines is an interpolation with cubic splines.

6. The method of claim 1, wherein the interpolation with splines is an interpolation with B-splines.

7. The method of claim 1, wherein each N-th point of the streamline, along which the particle travel from the injection well to the production well within the shortest time, is used to construct a set of the interpolation points.

8. The method of claim 1, where the interpolation is performed on a set of points, where each point is a center of mass of a set of points representing locations of particles corresponding to different streamlines at certain points in time.

9. The method of claim 1, where the interpolation is performed on a set of points, where each point is the center of mass of a set of points representing locations of particles corresponding to different streamlines at points in time corresponding to an equal percentage of a distance covered from the injection and production wells.

10. The method of claim 1, wherein the interpolation of points is an interpolation used with a quadratic Bezier curve constructed by three control points,
   wherein:
   a first point is a projection of an upper boundary coordinate of an injection well upper perforated interval onto a two-dimensional map;
   a second point is taken so that the Bezier curve passes through a point, which is a projection onto a two-dimensional map of a center of mass of a set of points, where each point corresponds to the midpoint of one of the streamlines connecting the injection and the production wells; and the third point is a projection of an upper boundary coordinate of a production well upper perforated interval onto a two-dimensional map.

11. The method of claim 1, wherein any subset of the edges and the verticies of the graph of the fluid flows is visualized.

12. The method of claim 11, wherein the edges to which the fluid flow volume corresponds within specified limits, are selected as a subset of the graph edges to be visualized.

13. The method of claim 1, wherein the fluid flows accumulated in several calculation steps of a hydrodynamic simulator are visualized.

14. The method of claim 13, wherein the interpolation is performed on the points which are the centers of mass for the interpolation points used at different times.

15. A computer-implemented system for visualization of fluid flow direction in heterogeneous porous medium in hydrocarbon reservoirs, based on streamlines, the system comprising:
   at least one processor,
a memory coupled to the processor;
   a computer programmable logic stored in the memory and executed on the processor, the logic is configured to execute the steps of claim 1.

* * * * *